United States Patent Office 3,231,528
Patented Jan. 25, 1966

3,231,528
EPOXY CURING AGENTS COMPRISING: POLYMERIC AMINO-AMIDES FROM MONOMERIC TUNG ACIDS AND POLYAMINES
Wayne F. McWhorter and David A. Shimp, Louisville, Ky., and Kenneth A. Earhart, Allentown, Pa., assignors, by mesne assignments, to Devoe & Raynolds Company, Inc., a corporation of Delaware
No Drawing. Filed Jan. 5, 1962, Ser. No. 164,606
8 Claims. (Cl. 260—18)

This invention pertains to the preparation of polymeric amino amide compositions for use as co-reactants with polyepoxides.

Amides of the general type contemplated herein are described by Bradley in U.S. 2,379,413. However, reactions are carried out in Bradley so that the amine number and the acid number are less than five. The Bradley compositions are, then, amides rather than amino amides. Amine compounds react much more readily with epoxide resins and, therefore, are much more widely used than amides in the epoxy resin field. Thus, the demand is much greater for amino amides than for amides as co-reactants with polyepoxides. Renfrew et al., in U.S. 2,705,223, describe the desirability of amino amides as reactants with epoxy resins and point out that resins of this general type are disclosed in Cowan et al.

Cowan et al., U.S. 2,450,940, prepare polyamides having molecular weights of about 3,000 to 5,000 from polymeric fat acids consisting primarily of dimeric fat acids (dibasic) having an average molecular weight of about 560 admixed with trimeric fat acids (tribasic) having an average molecular weight of about 840. To form these dimeric and trimeric fat acid mixtures, the fat oil or free fat acid is polymerized by the usual thermal treatment, the temperature required for polymerization varying with the type of polymerization catalyst. The polyamides are then obtained by heating, preferably in equimolar amounts, the thus polymerized fat acid or oil with a polyamine at a temperature of 150° C. to 175° C. and then at 175° C. to 225° C. If a large excess or deficiency of polyamine is used with the polymeric fat acid or oil, a very low molecular weight polymer is obtained. The reaction is stopped at a desired degree of reaction by following the basic or acidic neutral equivalent, the viscosity, or the gelation time on a hot plate.

The processes of Cowan et al. and Renfrew et al. have the disadvantage that the polymerization reaction of the first stage has a direct effect on the amide forming reaction subsequently carried out. This is due to the fact that if the fat acids are already highly polymerized, gelation will occur during dehydration of the polyamine salt of the fat acid to form the amide. If they are not previously highly polymerized, polymerization will continue during the second stage amine salt forming and dehydration reactions. The Cowan et al. and Renfrew et al. processes utilize dimers and trimers so that cross-linking will not take place.

In accordance with this invention, the process can more readily be controlled because the amide forming reaction is not affected by the polymerization. The way to avoid gelation in the Cowan et al. process, if the acids are too highly polymerized, is to react the polymeric acids with less polyamine. As a consequence, the product formed will contain unreacted carboxyl groups. Another way is to use dimerized and trimerized fat acids rather than high polymeric fat acids. Now, if the unsaturated acids or esters are reacted with the polyamine first to form amino amides, they can subsequently be polymerized to any degree. The result is that polymerization can be continued until just prior to gelation resulting in products having higher molecular weights than those obtainable by the process wherein the fatty acids or esters are polymerized first.

Previously, only polyamides, and not amino amides, have been made by such a process (as described by Jordan et al., U.S. 2,518,148). The reason for this is that temperatures at which amino amides polymerize, lead to the formation of undesirable products and to loss of amine. At polymerization temperatures above 250° C. as disclosed by Jordan et al., there is not only the possibility of oxidative and thermal degradation, but of an interchange process. Polyamine molecules, uncombined momentarily, are subject to loss by distillation from the system. This is especially true since polymers of high amine content require fewer interchanges to free polyamine molecules. That these reactions occur, with a resultant lessening of amino groups, is discernable from the observed darkening of compositions during polymerization, from the known presence of both amino groups and olefinic bonds, and from the presence of wafer resulting from imidazoline formation during polymerization according to:

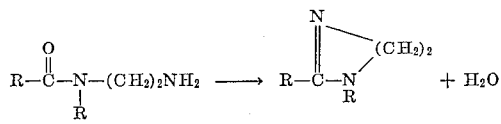

In accordance with the practice of this invention, it has been found that tung oil or tung oil acid derived amides permit the polymerization in the second stage to be conducted at temperatures sufficiently low so that amine interchange and the accompanying degradation reactions do not interfere with the product. Hence, polymeric amino amides useful as epoxy resin curing agents can be manufactured from tung oils in combination with polyalkylene polyamines according to the process of this invention by (1) aminolysis of the unsaturated tung oil by the polyamine followed by (2) removal of the free glycerin by vacuum distillation and finally (3) heat polymerization of the fatty amino amides at temperatures ranging from 200° C. to 250° C. In place of the tung oil, the derived acids can be used in which case step (1) becomes an amide formation step by water elimination and step (2) is omitted.

While this invention is applicable to tung oil, it has been found that the tung oil or the tung oil acids can have admixed therewith a small amount, not over twenty-five percent by weight based on the tung oil acids, of a less unsaturated oil or acids of such oils as dehydrated castor, cottonseed, linseed, corn, peanut, perilla, and the like. A desirable mixture includes tung oil acids with .5 percent to 25 percent less unsaturated acids by weight based on the tung oil acids. The amine and tung oil, or tung oil acid mixtures, are combined in a ratio of amino groups to acid or ester groups which is great enough to insure the presence of amino groups in the final product, even though some amine groups are consumed in imidazoline formation. Accordingly, at least one and one-half amine groups per acid or ester group are employed, and generally not more than ten amine groups per acid or ester groups.

Amines used in the reaction with tung oil are aliphatic polyamines having at least two primary amino groups and generally at least one secondary group. Desirable polyamines are diethylene triamine, triethylene tetramine, tetraethylene pentamine, 3,3-imino-bis-propylamine, 1,4-diamino butane, 1,3-diamino butane, hexamethylene diamine, and others as described in the Cowan et al. and Renfrew et al. references.

The first step in this process involves the reaction of the tung oil acid or the tung oil mixture with the aliphatic polyamine. This reaction takes place at a temperature in the range of 100° C. to 200° C., and this reaction temperature is maintained until the reaction is complete as indicated by titratable amine nitrogen. The reaction is considered complete when the titration indicates the disappearance of one amino group for each acid or ester group originally present. It has been found that an appreciable amount of the polyalkylene polyamine may be lost in the glycerin distillation step. This results from a random aminolysis reaction, some polyalkylene polyamines being linked three times or possibly more, while a small percentage remains unreacted. To circumvent this material loss, a smaller charge of polyamine may be used in the aminolysis stage. The fatty amino amide may then be bodied to a higher viscosity than that desired in the final product and the remainder of the polyalkylene polyamine used to break down the polymer chains to the desired viscosity and free amine content. Or the remainder of the amine may be added directly after the glycerin removal step and interchanged into the polymer network during polymerization. When the reaction is complete, the glycerin produced as a by-product of the reaction of the amine with the tung oil, when the oil is used, is distilled off under a reduced pressure of, say, 10 to 50 mm. Hg and at a temperature of 200° C. to 250° C.

As indicated hereinbefore, the polymerization temperature does not exceed 250° C. Generally, after the glycerin is removed by vacuum distillation, if the starting material is tung oil, the remaining unsaturated amino amides are heat polymerized at a temperature in the range of 200° C. to 250° C. One of the advantages of subsequently polymerizing the amino amide to form the polymeric amino amide is that a variety of polymeric products can be made depending upon the degree of polymerization. It cannot, however, be stated that the viscosity is in a particular viscosity range because the viscosity after the glycerin, if present, is removed, varies with the mol ratio of polyamine to acyl group used in the first reaction. Thus, when triethylene tetramine is used in a ratio of one mol amine per acyl group fatty substance, the viscosity, after any glycerin is removed, of a 70 percent solids solution in xylene is .85 poise, whereas if the ratio is 1 mol polyamine per 1.5 acyl groups, the viscosity of the 70 percent solids solution in xylene is 1.30 poises. On the other hand, if the mol ratio of triethylene tetramine to acyl groups is 1 to 2, the viscosity is as high as 1.85 poises when the composition is reduced to 60 second solids in 9 parts xylene to 1 part of the ethylether of ethylene glycol. The viscosity with other amines will also vary somewhat, for example, using a mol ratio of one diethylene triamine for two acyl groups results in a product, at the 60 percent solids, having a viscosity of 2.75 poises, compared to 1.85 for triethylene tetramine. Accordingly, to define the degree of polymerization, the increase in viscosity is best stated in terms of the initial viscosity, that is, the reduced viscosity at 70 percent solids concentration in xylene of the amino amide after glycerin removal. As a general rule, it can be stated that the polymerization reaction is carried out at the temperature range indicated and for a period of time such that the initial viscosity, measured in poises at the 70 percent solids solution in xylene, is increased threefold at the same solids concentration. In other words, the polymerization is carried out until the reduced or solution viscosity is at least three times the initial viscosity, the solids concentration being constant at 70 percent in xylene for the determined increase. The polymerization should, of course, not be continued so long that the polymerized product reaches the gel point.

It is noted that the polymeric amino amides of this invention will differ in structure depending on whether tung oil or tung oil acids are used initially. If tung oil acids are used, glycerin is not produced. Hence, there is no need for vacuum distillation. When the vacuum distillation step is carried out, imidazoline formation is more extensive, therefore the final product is more cyclic in structure. Water can be added at the end of the reaction in order to hydrolyze the imidazoline present back to the amino amide composition. That all of the imidazoline groups can be hydrolyzed to the amino amide structure is shown in infrared curves.

Preparation of polymeric amino amides of the type contemplated herein is believed best illustrated by reference to the following examples. These examples are for the purpose of illustration only, since other tung oil mixtures and amines will occur to one skilled in the art. It will be noted that in the examples, the course of the amine-fatty acid reaction is determined by titratable amine nitrogen. This is a method for determining the nitrogen content of amines by titration of their solutions in glacial acetic acid with a standarized solution of perchloric acid in glacial acid. In this acid medium, perchloric acid reacts stoichiometrically with a given amine to form the corresponding amine perchlorate which is generally soluble in the reagent so that the end point is readily detected. The percent titratable nitrogen as given in the examples is equal to $$\frac{V \times N \times 1.4}{W}$$

where V is the volume of perchloric acid used in ml., where N is the normality of perchloric acid solution adjusted to the temperature, and where W is the sample weight in grams.

*Example 1*

| Material | Mols | Grams |
|---|---|---|
| Tung Oil | 1 | 872 |
| Triethylene Tetramine (TETA) | 2.33 | 340 |
| Tetraethylene Pentamine (TEPA) | 0.677 | 128 |

The tung oil and triethylene tetramine are weighed into a three liter resin flask fitted with a four neck lid, reflux condenser, agitator assembly, thermocouple, sample tube and nitrogen line. The materials are heated to 204° C. and held five and one-half hours at which time the aminolysis is complete as indicated by titratable amine nitrogen. A downward distillation set-up is substituted for the reflux condenser and the liberated glycerin is distilled off under a vacuum of 40 mm. to a pot temperature slightly less than 250° C. The percentage of the theoretical amount of glycerin so removed is 95 percent.

Under a slow stream of nitrogen gas the reaction mixture is heat bodied at 243° C. to 249° C. to a reduced viscosity of 8.00 poises at 70 percent non-volatile solids in xylene. This operation takes approximately five hours. The composition contains on the average of three repeating units in polyamino amide chain.

The temperature is lowered to 204° C. and the tetraethylene pentamine is added to the reaction mixture. By holding this temperature two to four hours, the viscosity may be observed dropping steadily to a point, after which the viscosity stabilizes itself. To account for this phenomenon, it is necessary to assume that free amino groups are able to react by aminolysis with amide groups in the chain thereby reducing the average molecular weight of the reaction product. Typical constants are:

Viscosity at 25° C. _____ cps__ 42,000
Viscosity at 40° C. _____ cps__ 10,520
Wt./gal. _____ 8.19
Acid value _____ 0.2
Percent tit. nitrogen _____ 8.76

Example 2

| Material | Composition, Mols | Grams |
| --- | --- | --- |
| Tung Oil | 1.77 | 1,540 |
| Triethylene Tetramine (TETA) | 4.1 | 600 |
| Xylene | | 918 |

The tung oil and triethylene tetramine were weighed into a three liter resin pot equipped with a four neck lid, stirrer assembly, condenser, sample tube, thermocouple and nitrogen line. The materials were heated to 204° C. and held at that temperature for five and one-half hours during which time nitrogen was introduced over the surface of the reaction mixture.

Following this aminolysis stage, a downward distillation set-up was substituted for the condenser and the liberated glycerin was distilled under 40 mm. Hg pressure to a pot temperature of 245° C. to 249° C. The distillate contained 155 grams of glycerin (95 percent of theoretical) and 76 grams of triethylene tetramine as determined by the amine titration.

The vacuum was then released with nitrogen and the temperature reduced to 243° C. After six and one-half hours at 243° C. to 249° C. the reaction mixture had bodied from a reduced viscosity of 1.30 poises to 14.40 poises (at 70 percent solids in xylene). The reaction product was then reduced to 70 percent solids with xylene, and the following constants were determined:

| | |
| --- | --- |
| Percent yield | 98.6 |
| Viscosity _____poises__ | 14.40 |
| Color | .12 |
| Wt./gal. | 7.90 |
| Percent tit. nitrogen | 5.85 |
| Percent solids _____percent__ | 70 |
| Solvent | Xylol |

Example 3

| Material | Weight (grams) | Mols |
| --- | --- | --- |
| Tung Oil | 1,744 | 2 |
| Diethylene Triamine | 309 | 3 |
| Water | 25 | 1.4 |

The 1,744 grams of tung oil and 309 grams of diethylene triamine are weighed into a three liter resin flask equipped as in Example 1.

These materials are heated to 193° C. and held six hours for the completion of the aminolysis reaction. A downward distillation set-up is substituted for the reflux condenser and the liberated glycerin is distilled off under a reduced pressure of 28 mm. Hg to a pot temperature of 232° C. Steam is sparged through the reaction mixture which is maintained at 232° C. and under 28 mm. Hg pressure for a period of one hour, to aid in the removal of glycerin and traces of monoglycerides present.

The vacuum is released with nitrogen gas and the reaction mixture cooled to 100° C. at which temperature 25 grams of water is added to hydrolyze the imidazoline content. After one hour, the batch temperature is increased to 210° C. and held two hours and twenty minutes during which time the polymerization reaction has bodied the amino amides to a viscosity of 23.50 poises (at 60 percent solids in a 9 to 1 parts by weight mixture of xylol and the ethyl ether of ethylene glycol).

The reaction product is then reduced to 60 percent solids in the above solvent line-up and stored as a solution. Typical constants are:

| | |
| --- | --- |
| Viscosity _____poises__ | 23.50 |
| Percent solids | 60 |
| Wt./gal. | 7.76 |
| Color | .12 |
| Percent tit. nitrogen | 2.22 |

Example 4

| Material | Weight (grams) | Mols |
| --- | --- | --- |
| Tung Oil | 1,481 | 1.7 |
| Triethylene Tetramine (TETA) | 438 | 3.0 |
| Cottonseed Fatty Acids | 254 | 0.9 |
| Triethylene Tetramine (TETA) | 141 | 0.97 |
| Water | 60 | |

The 1,481 grams of tung oil and 438 grams triethylene tetramine are weighed into a three liter resin flask equipped with a four neck lid, reflux condenser, agitator assembly, thermocouple and sparge tube. The materials are heated to 204° C. and held four hours, after which time the aminolysis reaction is complete as indicated by titratable amine nitrogen determinations.

The 254 grams of cottonseed fatty acids are then added to the reaction mixture at 204° C. and the temperature held for two additional hours after which time the low acid number of less than five indicated substantially complete reaction.

A downward distillation set-up is substituted for the reflux condenser and the liberated glycerin and water is distilled off under a reduced pressure of 35 mm. Hg to a pot temperature of 246° C. During the last hour of vacuum distillation, steam is introduced to the bottom of the flask to aid in the removal of glycerin and small amounts of monoglycerides present.

The amount of distillate as measured by the weight loss of the reaction mixture was 263 grams. The theoretical amount of glycerin and water liberated during amide formation is 172 grams. The extra 91 grams distillate consists of monoglycerides and water condensed during the formation of a cyclic imidazoline type structure which occurs as a side reaction to an extent of approximately 25 to 50 percent of theory.

With the reaction mixture at atmospheric pressure, 141 grams of triethylene tetramine is added, this polyamine becoming part of the polymer structure during the bodying stage by means of an amino amide interchange.

The unsaturated fatty amino amides are now polymerized through their unsaturation to viscous polymers by raising the temperature to 243° C. to 249° C. and holding until the reduced viscosity at 70 percent solids in xylene rises from about 1.80 poises. A stream of nitrogen gas is maintained over the surface of the reaction mixture during this operation to prevent excessive darkening.

After twelve hours at 243° C. to 249° C. a 9.00 poises reduced viscosity is obtained and the reaction mixture is cooled to 121° C. Sixty grams of water is added and allowed to react at this temperature for two hours. The hydrolysis of imidazoline type structure is substantially complete after this treatment and excess water is removed by vacuum distillation to 177° C. About 30 grams of water is retained in the reaction product.

The product is reduced with xylene to 70 percent solids and stored as such. Typical constants are:

| | |
| --- | --- |
| Viscosity _____poises__ | 27.00 |
| Percent solids | 68.12 |
| Wt./gal. | 7.87 |
| Color | 13 |
| Percent tit. nitrogen | 5.67 |

The last step in the reaction, that is, the hydrolysis of the imidazoline structure may be omitted. This results in a lower viscosity product which is characterized by greater compatability with bisphenol based epoxy resins and a longer pot life.

Example 5

| Material | Weight (grams) | Mols |
| --- | --- | --- |
| Tung Oil | 2,221 | 2.55 |
| Triethylene Tetramine (TETA) | 657 | 4.50 |
| Cottonseed Fatty Acid | 381 | 1.35 |
| Triethylene Tetramine (TETA) | 212 | 1.45 |
| Tetraethylene Pentamine (TEPA) | 380 | 2.01 |

The 2,221 grams of tung oil and 657 grams of triethylene tetramine (TETA) are weighed into a five liter resin flask equipped with a four neck lid, reflux condenser, agitator assembly, thermocouple and sparge tube. The materials are heated to 204° C. and held four hours, after which time the aminolysis reaction is complete as indicated by titratable amine nitrogen determinations. The 381 grams of cottonseed fatty acids are then added to the reaction mixture at 204° C. and the temperature held for two additional hours after which time the low acid number of less than five indicates substantially complete reaction.

A downward distillation set-up is substituted for the reflux condenser and the liberated glycerin and water is distilled off under a reduced pressure of 35 mm. Hg to a pot temperature of 246° C. During the last hour of vacuum distillation, steam is introduced to the bottom of the flask to aid in the removal of glycerin and small amounts of monoglycerides present.

The amount of distillate as measured by the weight loss of the reaction mixture was 344 grams. The theoretical amount of glycerin and water liberated during amide formation is 260 grams. The extra 84 grams distillate consists of monoglycerides and water condensed during the formation of a cyclic imidazoline type structure which occurs as a side reaction to an extent of approximately 25 to 50 percent of theoretical.

With the reaction mixture at atmospheric pressure, 212 grams triethylene tetramine is added, this polyamine becoming part of the polymer structure during the bodying stage by means of an amino amide interchange.

The unsaturated fatty amino amides are now polymerized through their unsaturation to viscous polymers by raising the temperature to 243° C. to 249° C. and holding until the reduced viscosity at 70 percent solids in xylene rises from about 1.80 poises to 5.50 poises. A stream of nitrogen gas is maintained over the surface of the reaction mixture during this operation to prevent excessive darkening.

After six hours at 243° C. to 249° C. a 6.00 poises reduced viscosity is obtained and 380 grams tetraethylene pentamine is added. The temperature is reduced at 204° C. and the reaction mixture held two to four hours. The reduced viscosity gradually lowers during this amino amide interchange and stabilizes in two to four hours to 2.25 poises. The reaction mixture is then cooled and stored for use at 100 percent solids. Typical constants obtained are:

| | |
| --- | --- |
| Viscosity at 25° C. _____cps__ | 24,000 |
| Wt./gal. | 8.14 |
| Acid number | 0.2 |
| Percent tit. nitrogen | 8.87 |
| Reduced viscosity at 70 percent solids in xylene _____poises__ | 2.30 |

As an optional procedure, the reaction product can be cooled to 121° C. after the last step and 100 grams water added. The temperature is maintained at 121° C. for two hours and the excess water stripped off under vacuum to a pot temperature of 149° C. About 50 grams water is retained by the reaction product, this water having hydrolyzed the imidazoline structure content back to the amino amide. Typical constants obtained after employing this optional hydrolysis step are:

| | |
| --- | --- |
| Viscosity at 25° C. _____cps__ | 49,400 |
| Wt./gal. | 8.21 |
| Acid number | 0.2 |
| Percent tit. nitrogen | 8.74 |
| Reduced viscosity at 70 percent solids in xylene _____poise__ | 4.00 |

The amino amides of this invention are excellent curing agents for epoxy resins. As a consequence, they can be incorporated in epoxy resin composition used in castings, coatings and the like. By "epoxy resin" is meant glycidyl polyethers of polyhydric alcohols and polyhydric phenols prepared by reacting the alcohol or phenol with a halohydrin such as epichlorhydrin in the presence of an alkali. These are well-known epoxy resins described in such patents as U.S. 2,467,171, U.S. 2,538,072, U.S. 2,582,985, U.S. 2,615,007, U.S. 2,698,315, and U.S. 2,581,464. In addition to epoxy (i.e., oxirane) ethers, epoxy esters are included if the materials are to be heat cured. Desirable epoxy esters can be made by the epoxidation of unsaturated esters by reaction with a peracid such as peracetic acid or performic acid, a desirable ester thus prepared being, 3,4-epoxy-6-methylcyclohexylmethyl-3-4-epoxy-6-methylcyclohexanecarboxylate.

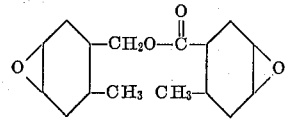

Other epoxy compounds included, depending on end use, are, for example, the diglycidyl ether of trimethylol propane, dicyclopentadiene diepoxide, and bis-epoxy-dicyclopentyl ether of ethylene glycol. When used with epoxy resins, the amino amides of this invention are used in an amount of 0.5 to 1.5 amine equivalent per epoxy equivalent. By "amine equivalent" is meant the weight of amino amides in grams per amine group, and by "epoxy equivalent" is meant the weight in grams of epoxy resin per epoxy group.

The amino amide of Example 5 (referred hereinafter as Agent Ex. 5) has been evaluated as a curing agent for low viscosity expoxide resin (hereinafter referred to as Resin 509,) made from a ratio of ten mols of epihalohydrin per mol of bisphenol, and having a viscosity of 9,000 cps. When blended with this resin, the amino amide becomes compatible with the resin in approximately five minutes, whereas some curing agents require 30 or 35 minutes before compatibility is obtained. The amino amide composition of Example 5 was mixed with the low viscosity resin in three ratios. The mixes were preheated to 45°C. to 55° C. while molds were preheated to 55° C. to 60° C. Castings gave the following mechanical and electrical properties:

| | Parts by Weight | | |
| --- | --- | --- | --- |
| Resin 509 | 100 | 100 | 100 |
| Agent of Ex. 5 | 42.9 | 67 | 100 |
| Curing Schedule | Six weeks at room temperature | | |
| Viscosity, cps. (81° F.) | 10,960 | 11,200 | 13,900 |
| Gel Time, Hrs./Min. | 2/14 | 1/56 | 1/42 |
| Maximum Exotherm 1 lb. batch, ° F. | 246 | 300 | 283 |
| Tensile Strength, p.s.i. | 6,700 | 8,500 | 8,300 |
| Flexural Strength, p.s.i. | 11,900 | 14,600 | 13,000 |
| Compressive Yield Strength, p.s.i. | 13,200 | 12,000 | 10,300 |
| Izod Impact (ft. lbs./in. of notch) | 0.382 | 0.578 | 1.311 |
| Hardness (Shore D) | 86 | 84 | 82 |
| Heat Distortion, ° C. | 45 | 59 | 58 |

The following table shows a comparison of 1.5 mil films of two enamels on 20 gauge cold rolled steel panels. These enamels are identical, except that one contains tetraethylene pentamine and the other contains the curing agent of Example 5 (agent of Example 5). The enamel was made by pigmenting an epoxide resin solution containing three percent urea-formaldehyde resin for flow control, the epoxide resin being a solid polyepoxide made from a ratio of 1.22 mols of epichlorhydrin to 1 mol of bisphenol.

TEST RESULTS

|  | Agent of Ex. 5 | | | TEPA 4% |
|---|---|---|---|---|
|  | 15% | 20% | 25% | |
| Pencil Hardness After— | | | | |
| 3 days | F | F | F | H |
| 7 days | F | F | F | H |
| 21 days | F | H | F | 2H |
| 30 days | H | 2H | H | 3H |
| 60 days | 2H | 3H | 2H | 4H |
| 90 days | 4H | 4H | 2H | 4H |

FLEXIBILITY TEST—1.5 MILS ON 20 GAUGE STEEL PANELS

|  | Agent of Ex. 5 | | | TEPA 4% |
|---|---|---|---|---|
|  | 15% | 20% | 25% | |
| Conical Mandrel Bend After— | | | | |
| 3 days | OK | OK | OK | OK |
| 30 days | OK | OK | OK | OK |
| 90 days | OK | OK | OK | OK |
| Convex Bump 80 in.-lbs.: | | | | |
| 3 days | OK | OK | OK | OK |
| 30 days | OK | OK | OK | OK |
| 90 days | OK | OK | OK | OK |

CHEMICAL RESISTANCE—1.5 MIL FILMS ON CAST STEEL PROBES

[Numbers indicate days to failure—pin-point blisters and/or softening. OK indicates no failure after 90 days]

|  | Agent of Ex. 5 | | | TEPA 4% |
|---|---|---|---|---|
|  | 15% | 20% | 25% | |
| Immersion In— | | | | |
| 10% Caustic | 60 | 90 | 90 | OK |
| 10% Muriatic Acid | 14 | 21 | 7 | 7 |
| 3% Salt Water | 2 | 21 | 14 | 21 |
| Distilled Water | 1 | 2 | 2 | 2 |
| Xylol | 60 | 30 | 21 | OK |
| Gasoline | OK | OK | OK | OK |

What is claimed is:

1. A process for the preparation of polymeric amino amides which comprises
   (a) bringing together a polyalkylene polyamine having at least two primary amino groups and a fatty substance selected from the group consisting of tung oil fatty acids and their polyhydric alcohol esters, in an amount of at least 1.5 hydrogen containing amino groups of polyamine per acyl group of fatty substance
   (b) heating the mixture to a temperature in the range of 100° C. to 200° C. sufficient to bring about an aminolysis reaction of the polyamine and the fatty substance to produce an amino amide, having free amine groups,
   (c) subsequently heating the resulting amino amide at a temperature sufficient to polymerize the amino amide but below 250° C., and
   (d) polymerizing the amino amide to a viscosity which is at least three times the initial viscosity of the amino amide, each viscosity being measured in poises at 70 percent solids solution in xylene.

2. The process of claim 1 wherein tung oil is employed and wherein free glycerin is removed by vacuum distillation prior to the heat polymerization.

3. The process of claim 1 wherein the polyalkylene polyamine is a polyethylene polyamine and wherein the fatty substance is tung oil fatty acids.

4. The process of claim 3 wherein the tung oil fatty acids have in admixture therewith .5 percent to 25 percent less unsaturated acids by weight based on the tung oil acids.

5. A composition of matter comprising an epoxy resin selected from the group consisting of epoxy ethers and epoxy esters having terminal oxirane groups and a polymeric amino amide prepared by (a) bringing together a polyalkylene polyamine having at least two primary amino groups and a fatty substance selected from the group consisting of tung oil fatty acids and their polyhydric alcohol esters, in an amount of at least 1.5 hydrogen containing amino groups of polyamine per acyl group of fatty substance, (b) heating the mixture to a temperature in the range of 100° C. to 200° C. sufficient to bring about an aminolysis reaction of the polyamine and the fatty substance to produce an amino amide, having free amine groups, (c) subsequently heating the resulting amino amide at a temperature sufficient to polymerize the amino amide but below 250° C., and (d) polymerizing the amino amide to a viscosity which is at least three times the initial viscosity of the amino amide, each viscosity being measured in poises at 70 percent solids solution in xylene.

6. The composition of claim 5 wherein tung oil is employed and wherein free glycerin is removed by vacuum distillation prior to the heat polymerization.

7. The composition of claim 6 wherein the polyalkylene polyamine is a polyethylene polyamine and wherein the fatty substance is tung oil fatty acids.

8. The composition of claim 7 wherein the tung oil fatty acids have in admixture therewith .5 percent to 25 percent less unsaturated acids by weight based on the tung oil acids.

References Cited by the Examiner

UNITED STATES PATENTS 2,518,148    8/1950    Jordan et al. _____ 260—18

FOREIGN PATENTS 574,166    4/1959    Canada.

OTHER REFERENCES

Lee et al., Epoxy Resins, Their Applications and Technology, McGraw-Hill, New York, 1957 (page 110).

LEON J. BERCOVITZ, *Primary Examiner.*

ALPHONSO D. SULLIVAN, *Examiner.*

T. D. KERWIN, C. W. IVY, *Assistant Examiners.*